US008899187B2

(12) United States Patent
Axelrod et al.

(10) Patent No.: US 8,899,187 B2
(45) Date of Patent: Dec. 2, 2014

(54) ARTICULATING CHEW TOY HAVING A NOISE MECHANISM

(75) Inventors: Glen S. Axelrod, Colts Neck, NJ (US); Ajay Gajria, Maharashtra (IN)

(73) Assignee: T. F. H. Publications, Inc., Neptune City, NJ (US)

( * ) Notice: Subject to any disclaimer, the term of this patent is extended or adjusted under 35 U.S.C. 154(b) by 306 days.

(21) Appl. No.: 13/097,410

(22) Filed: Apr. 29, 2011

(65) Prior Publication Data

US 2012/0272922 A1 Nov. 1, 2012

(51) Int. Cl.
*A01K 29/00* (2006.01)
*A01K 11/00* (2006.01)

(52) U.S. Cl.
CPC ................................. *A01K 15/026* (2013.01)
USPC .......................................... 119/707; 119/709

(58) Field of Classification Search
CPC .... A01K 15/02; A01K 15/025; A01K 15/026
USPC .................... 119/702, 707, 709–711
See application file for complete search history.

(56) References Cited

U.S. PATENT DOCUMENTS

| | | | |
|---|---|---|---|
| 2,131,229 A | 9/1938 | McMennamin | |
| 4,173,317 A | 11/1979 | Hamayasu et al. | |
| 5,191,856 A * | 3/1993 | Gordon | 119/711 |
| 6,112,703 A * | 9/2000 | Handelsman | 119/707 |
| 6,126,509 A * | 10/2000 | Berman | 446/418 |
| 6,216,640 B1 * | 4/2001 | Zelinger | 119/707 |
| 6,892,674 B1 * | 5/2005 | Dubinins et al. | 119/707 |
| 6,981,471 B1 | 1/2006 | Dubinins et al. | |
| 7,144,293 B2 * | 12/2006 | Mann et al. | 446/184 |
| 7,389,748 B2 | 6/2008 | Shatoff et al. | |
| 7,591,234 B2 * | 9/2009 | Shatoff et al. | 119/707 |
| 2004/0134434 A1 * | 7/2004 | Kraft et al. | 119/51.01 |
| 2009/0078214 A1 | 3/2009 | Mann | |
| 2009/0095231 A1 | 4/2009 | Axelrod et al. | |

FOREIGN PATENT DOCUMENTS

| | | |
|---|---|---|
| CN | 2572765 | 9/2003 |
| CN | 101647409 | 2/2010 |

OTHER PUBLICATIONS

International Search Report and Written Opinion from corresponding PCT Application No. PCT/US2012/035357 dated Aug. 7, 2012.
Office Action from corresponding Chinese Application No. 201280027050.8 dated Jul. 3, 2014. English translation attached.

* cited by examiner

*Primary Examiner* — David Parsley
(74) *Attorney, Agent, or Firm* — Grossman, Tucker, Perreault & Pfleger, PLLC (57) ABSTRACT

An animal chew toy is provided comprising a hollow intermediate member located between first and second opposing end members connected to the intermediate member. The first end member may be connected to the intermediate member by a first rotatable joint formed between the first end member and the intermediate member, and the second end member may be connected to the intermediate member by a second rotatable joint formed between the second end member and the intermediate member. A sound generating mechanism may be contained within the intermediate member, and at least one of the first and second end members may be operable with the intermediate member to form the sound generating mechanism.

24 Claims, 7 Drawing Sheets

ARTICULATING CHEW TOY HAVING A NOISE MECHANISM

FIELD OF THE INVENTION

The present invention relates to toys for animals, particularly pets, and particularly pet chew toys. More particularly, the present invention relates to a pet chew toy that articulates and makes noise when articulating.

BACKGROUND

Pets, and particularly dogs, are known for their penchant to bite, gnaw and otherwise chew upon objects, particularly items which may spur their natural instincts, such as natural bones. Unfortunately, dogs may also chew objects such furniture, shoes, hats and other household items causing unwanted damage thereto.

In light of the above, numerous toys have been developed to provide dogs with an enjoyable object to chew. Preferably, such toys are a distraction to which the dog, or any other pet, will direct its attention and chew upon instead of coveted items such as household décor.

While most dogs may enjoy chewing on objects, preferences appear to vary as to the hardness of the substances favored. Some dogs may like to chew on very hard materials such as cow bones, wood and nylon, while other dogs may prefer softer materials such as rubber or other elastomers. Such dogs, due to their age, may not be able to chew on very hard substances. Young dogs may have insufficiently developed teeth, while old dogs may have diseased gums or may have lost some of their teeth.

Attempts have been made at creating toys that attract pets, such as providing toys in the shape of animal bones, generally having a larger end and smaller shaft to allow the dog to more easily pick them up. Also, in this manner, a dog may hold the bone between their paws in order to chew it, thus providing a means for easy access to maintain interest.

Another means to make a toy more attractive to a pet may be to include an enclosed bell or an air squeaker. However, if removed from the toy, it may be possible for these items to be swallowed by the pet.

Another purpose of animal toys has been to provide a surface upon which the animal's teeth may be scraped. Pets, such as dogs and cats, are subject to dental health problems. These problems may be traced to the formation of bacterial plaque that forms on the exterior of teeth. Tartar is the result of the thickening and hardening (mineralization) of the plaque. Dental prophylaxis is promoted in pets, and especially dogs, by the scraping of surfaces against the pet's teeth.

Another purpose of animal toys has been to provide exercise for the animals by encouraging play. Certain pets, do to a sedentary lifestyle, may gain weight or suffer from other health problems. Consequently, play is encouraged in pets to reduce the likelihood of such health issues.

While the above certainly contribute to the art of providing chew toys, there is still a need for improvement. It is an object of the present invention to improve upon the art of chew toys by providing a relatively rigid chew toy that provides noise in conjunction with articulation, and which may promote dental prophylaxis and which may encourage play.

SUMMARY

According to one object of the present disclosure, a toy for an animal is provided which may encourage the animal to play to provide exercise for the animal, as well as may encourage the animal to chew upon to promote dental prophylaxis and other health benefits.

According to another object of the present disclosure, a toy for an animal may be provided which comprises a hollow intermediate member located between first and second opposing end members connected to the intermediate member. The first end member may be connected to the intermediate member by a first rotatable joint formed between the first end member and the intermediate member, and the second end member may be connected to the intermediate member by a second rotatable joint formed between the second end member and the intermediate member. A sound generating mechanism may be contained within the intermediate member, and at least one of the first and second end members may be operable with the intermediate member to form the sound generating mechanism.

According to another object of the present disclosure, at least one of the first joint and the second joint may be a mechanical joint, such as a snap fit joint and/or an annular joint.

According to another object of the present disclosure, at least one of the first end member and second end member may be rotatable in a complete revolution around a longitudinal axis of the intermediate member. More particularly, at least one of the first end member and second end member may be rotatable in both clockwise and counterclockwise directions around a longitudinal axis of the intermediate member.

According to another object of the present disclosure, at least one of the first and second end members may be movable, and more particularly rotatable, relative to the intermediate member to provide successive clicking sounds from the sound generating mechanism.

According to another object of the present disclosure, at least one of the first and second end members may be rotatable in a clockwise direction and a counterclockwise direction around a longitudinal axis of the intermediate member to provide successive clicking sounds from the sound generating mechanism.

According to another object of the present disclosure, the sound generating mechanism may comprise a plurality of teeth and at least one teeth engagement element configured to generate successive clicking sounds when at least one of the teeth and the teeth engagement element is moved, and more particularly rotated, relative to the other.

According to another object of the present disclosure, the teeth engagement element may be configured to contact and elastically deform over the teeth when at least one of the teeth and the teeth engagement element is rotated relative to the other. More particularly, each of the teeth may have an apex, and the teeth engagement element may be configured to contact and elastically deform over the apex of the teeth when at least one of the teeth and the teeth engagement element is rotated relative to the other.

According to another object of the present disclosure, the teeth engagement element may be configured to undergo increasing elastic deformation as it approaches the apex of the teeth when at least one of the teeth and the teeth engagement element is rotated relative to the other.

According to another object of the present disclosure, the teeth engagement element may be configured to elastically recover after passing the apex of the teeth when at least one of the teeth and the teeth engagement element is rotated relative to the other. More particularly, the teeth engagement member may be configured to generate a clicking sound upon the elastic recovery.

According to another object of the present disclosure, the intermediate member may have an internal passage, the sound generating mechanism may comprise a plurality of teeth and the teeth may be arranged in a circular pattern around the internal passage.

According to another object of the present disclosure, the teeth may project inwardly a longitudinal axis of the intermediate member and be symmetrical.

According to another object of the present disclosure, the sound generating mechanism may comprise a teeth engagement element formed on at least one of the end members configured to engage teeth on the intermediate member.

According to another object of the present disclosure, the teeth engagement element may be formed at a proximal end of at least one of the end members and may comprise an elongated leg which has an S-shape.

According to another object of the present disclosure, the teeth engagement element may comprise first and second elongated legs configured to engage teeth on the intermediate member, and each leg may have an S-shape, which may be minor images of the other.

According to another object of the present disclosure, the elongated leg may be configured to bend at a first location when the leg contacting the intermediate member when the end member is rotated in a clockwise direction and configured to bend at a second location when the leg contacting the intermediate member when the end member is rotated in a counter clockwise direction.

According to another object of the present disclosure, the elongated leg may be configured to engage teeth at a first location when the end member is rotated in a clockwise direction and configured to engage teeth at a second location when the end member is rotated in a counter clockwise direction.

According to another object of the present disclosure, at least one of the first and second opposing end members may comprise an edible material composition.

According to another object of the present disclosure, at least one of the first and second opposing end members may comprise a receptacle which contains an edible material composition.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting.

Figure 1:
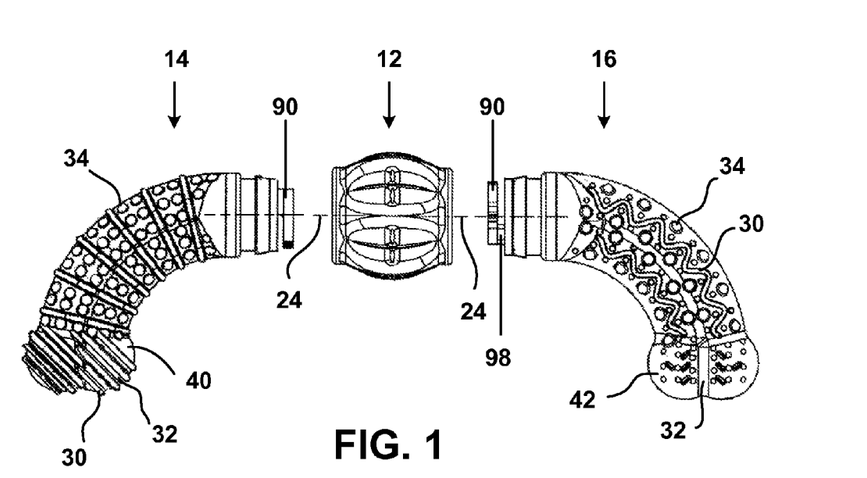
FIG. 1 is an exploded side view of a chew toy according to one embodiment of the present disclosure.

Referring to FIG. 1, there is shown an animal chew toy, such as for a dog or other pet, at reference character 10. As shown, chew toy 10 comprises a tubular (hollow) intermediate coupling hub member 12 located between opposing first flanking end member 14 and a second flanking end member 16. Members 12, 14 and 16 may be made of a material composition, such as a plastic composition, which may comprise one or more natural or synthetic polymers, such as a thermoplastic polymer or a thermoset polymer. More particularly, the polymer may comprise a rigid thermoplastic or thermoset polymer. Exemplary thermoplastic polymers may include, polyamide, polyacetal and polyester. Members 12, 14 and 16 may be formed by injection molding, or other plastic molding technique.

As used herein, a rigid polymer may be characterized as a material which has a modulus of elasticity wither in flexure or in tension greater than 700 MPa (100 kpsi) at 23° C. and 50% relative humidity when tested in accordance with ASTM methods D747, D790, D638, D882 or D883.

Members 12, 14 and 16 may also be made of a plastic composition having a Shore A durometer hardness of greater than 70, including all values and increments therein up to 100, e.g. 80, 90, etc. and/or a tensile strength equal or greater than 10,000 psi.

Figure 2:
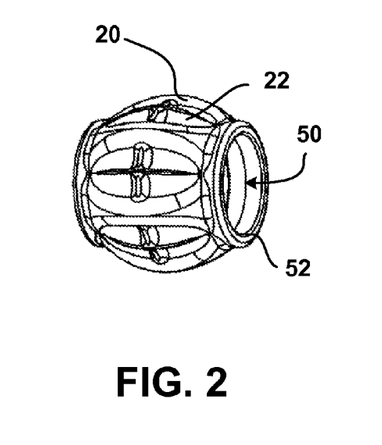
FIG. 2 is a perspective view of an intermediate member of the chew toy of FIG. 1.
Figure 3:
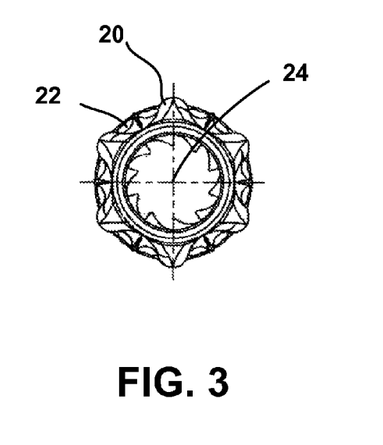
FIG. 3 is an end view of the intermediate member of FIG. 2.
Figure 4:
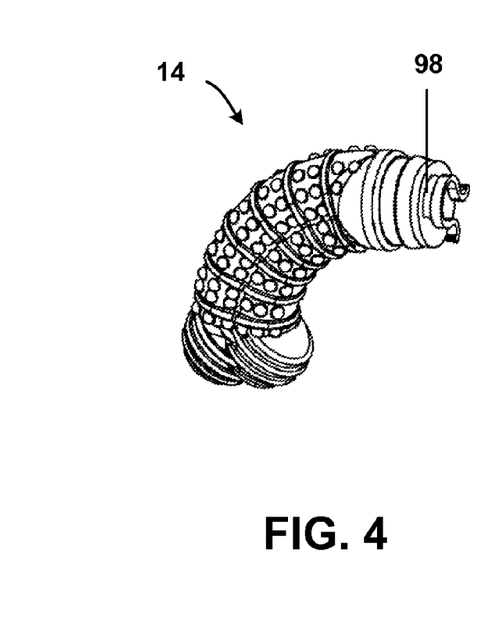
FIG. 4 is a perspective view of a first end member of the chew toy of FIG. 1.
Figure 5:
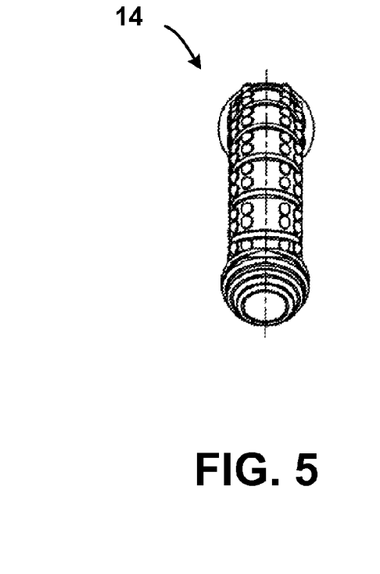
FIG. 5 is an end view of the first end member of FIG. 4.
Figure 6:
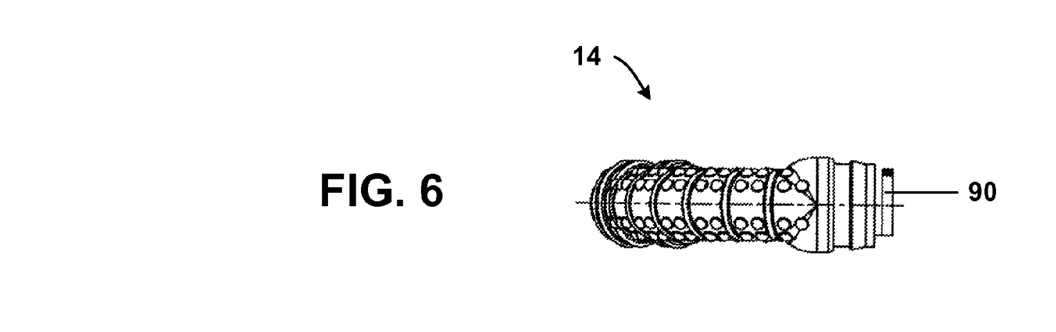
FIG. 6 is a top view of the first end member of FIG. 4.

As best shown in FIGS. 2 and 3, intermediate member 12 may have a circular or generally cylindrical outer shape including one or more longitudinally extending ridges 20 or recesses 22, which may make the chew toy 10 easier to grasp or hold by an animal. More particularly, intermediate member 12 is shown to include a plurality of longitudinally arranged ridges 20 and recesses 22 which are equally spaced circumferentially around a centrally located longitudinal axis 24 of intermediate member 12. Ridges 20 may be used to promote dental prophylaxis while recesses 22 may be used to accommodate the animal's tongue. For example, ridges 20 may rub against the animal's teeth and gums to clean the teeth by removing food residue, plaque and other coatings which may be on the teeth.

Similarly, end members 14 and 16, details of which are shown in FIGS. 4-7 and FIGS. 8-11, respectively, may include numerous surface asperities including elongated ridges 30, recesses 32 and circular protrusions 34. End members 14, 16 and may also include enlarged (bulbous) terminal distal end portions 40, 42, which may simulate condyle portions of a bone.

Figure 12:
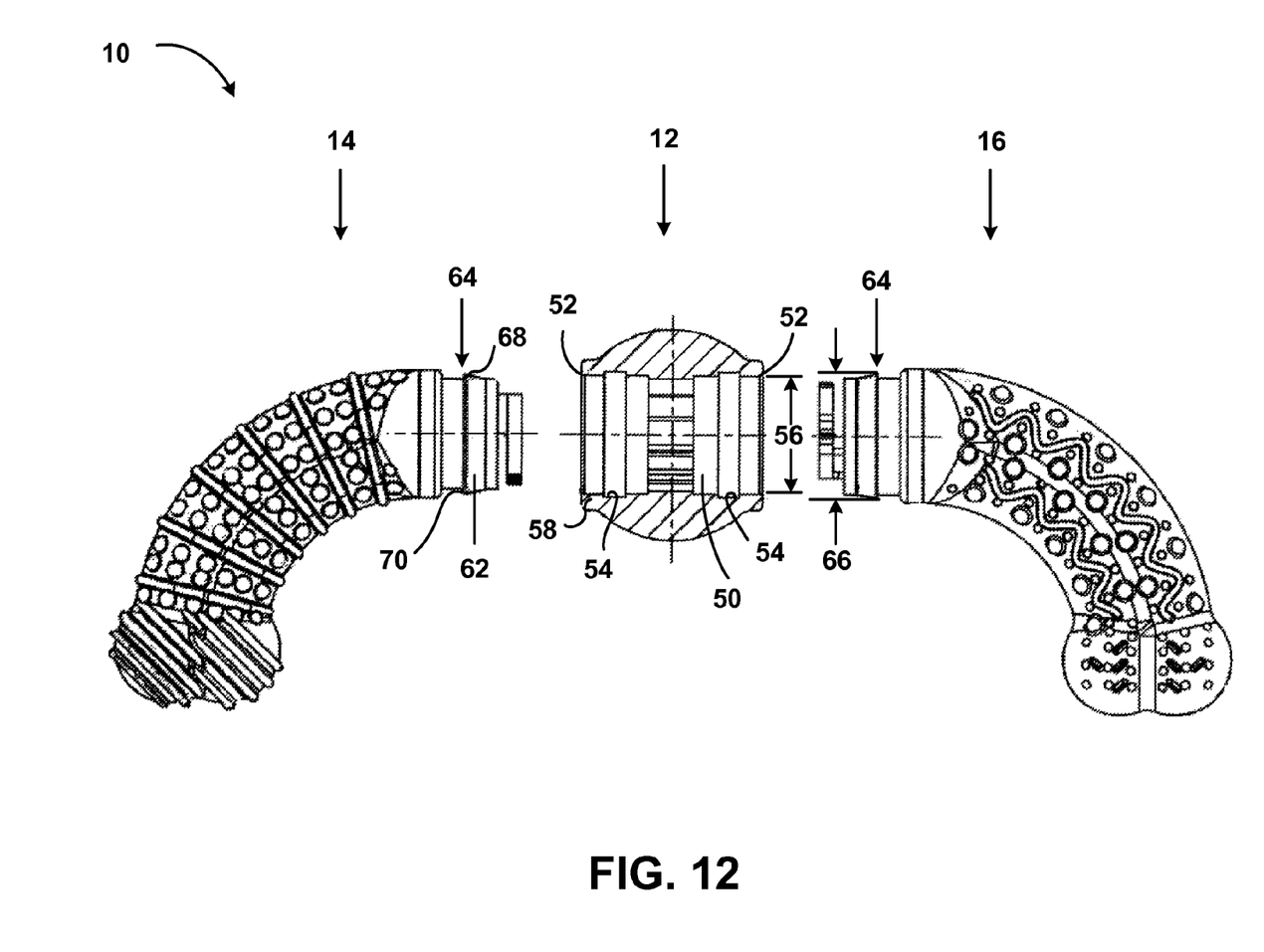
FIG. 12 is an exploded side view of the chew toy of FIG. 1 with a cross-sectional view of the intermediate member.

As best shown in FIG. 12, intermediate member 12 includes an elongated internal passage 50. As shown, passage 50 extends longitudinally through intermediate member 12, where it may be viewed from opposing end openings 52.

Each end member 14 and 16 may be directly connected to intermediate member 12 by a snap fit joint, which may be understood to be a type of mechanical joint formed between mating parts. Joining may be understood to require the connecting feature of one of the parts to momentarily move aside (e.g. deform) for engagement with the mating part, followed by return of the connecting feature towards its initial position (e.g. deformation recovery) to create an interference between the parts which thereafter inhibits separation thereof.

More particularly, each end member 12 and 14 may be directly connected to intermediate member 12 by an annular snap fit joint. An annular snap fit joint may be understood to involve interference between concentric cylindrical parts and rely on radial elasticity for assembly and retention. It may be thought of as a catch having an annular form on a first cylindrical part which resides in a cylindrical recess of a second cylindrical part to inhibit disassembly thereof.

As show in FIG. 12, each end member 14, 16 has a proximal cylindrical portion 62 (proximal relative to intermediate member 12 and distal end portions 40, 42) which has a male engagement element in the form of an annular ridge 64 which is configured to mate with a female engagement element in the form of an annular recess 54 (undercut cavity) of intermediate member 12, which is adapted to receive annular ridge 64 to form an annular snap-fit joint.

Figure 13:
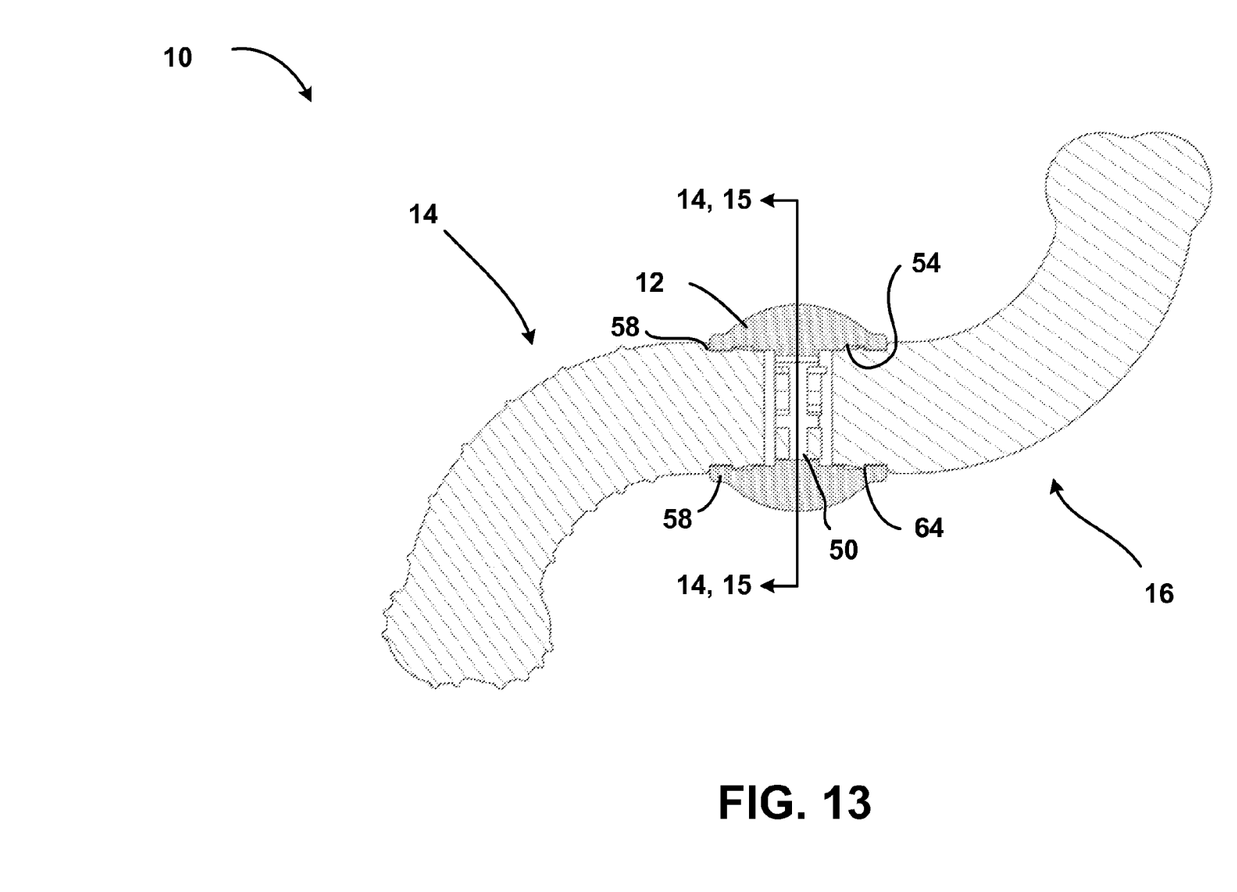
FIG. 13 is a longitudinal cross-sectional view of the chew toy of FIG. 1 when assembled.

As best shown in FIG. 12 the maximum diameter/circumference 66 of annular ridge 64 is greater than the maximum circumference 56 of the opening 52 to passage 50. During assembly, annular ridge 64 may be quickly forced into annular (undercut) recess 54 with a snap-fit, causing intermediate member 12, particularly at entrance opening 52 and lip 58, to elastically deform and increase to a size to allow annular ridge 64 to pass through and accommodate the insertion of annular ridge 64 into annular recess 54. In this manner, as shown in FIG. 13, as soon as circumference 66 of annular ridge 64 is located within annular recess 54, entrance opening 52 and lip 58 decrease in size to inhibit annular ridge 64 from separating from annular recess 54, thus connecting intermediate member 12 and end members 14, 16 together.

As shown in FIG. 12, annular ridge 68 has a lead-in angle 68 of less than 90 degrees to provide a ramp/incline plane to aid in assembly of intermediate member 12 and end members 14, 16, and a return angle 70 of 90 degrees (no ramp) to inhibit future separation of intermediate member 12 and end members 14, 16. Furthermore, the snap-fit joints formed intermediate member 12 and end members 14, 16 are inaccessible as being contained within intermediate member 12. In the foregoing manner, the snap-fit joint may be referred to as an inseparable or permanent snap-fit joint, and may be understood to be configured to inhibit separation of intermediate member 12 and end members 14, 16.

The annular snap-fit joints formed between intermediate member 12 and end members 14, 16 allow end members 14, 16 to rotate in a complete 360 degree revolution around longitudinal axis 24 (axis of rotation) of intermediate member 12. Furthermore, end members 14, 16 are rotatable in both clockwise and counterclockwise directions around longitudinal axis 24 of intermediate member 12.

Figure 14:
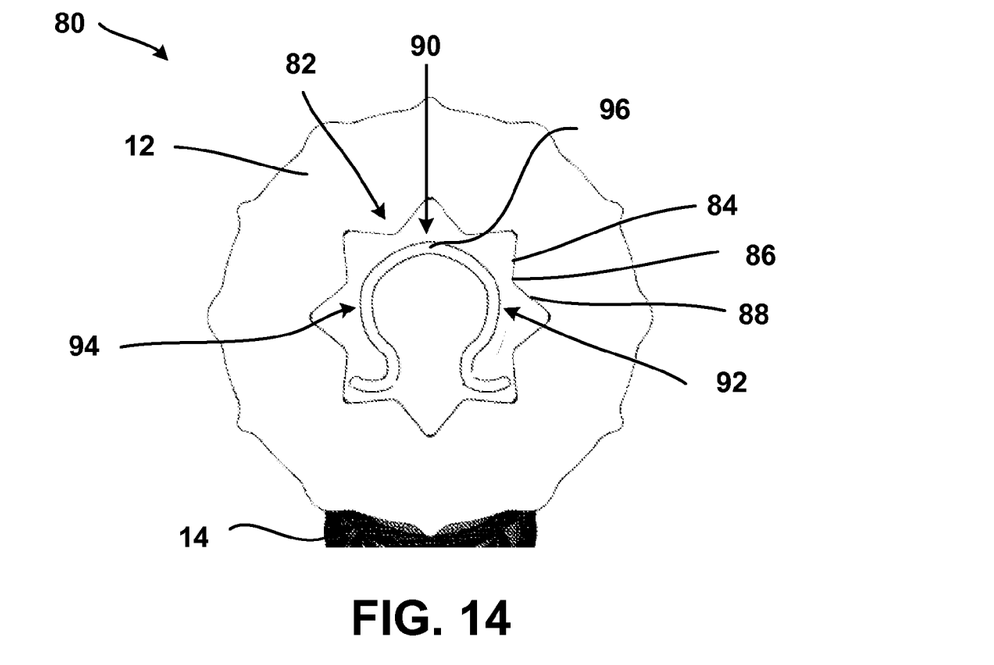
FIG. 14 is a cross-sectional view of the assembled chew toy of FIG. 13 taken along line 14-14 of FIG. 13.
Figure 15:
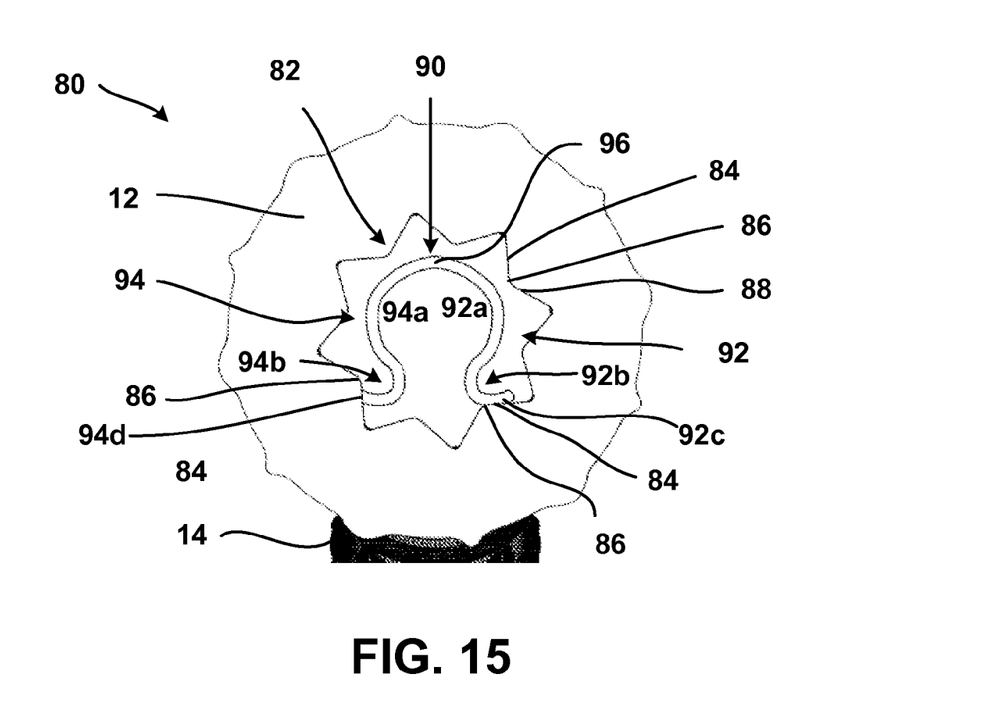
FIG. 15 is a cross-sectional view of the assembled chew toy of FIG. 13 taken along line 15-15 of FIG. 13.

As shown in FIGS. 14 and 15, chew toy 10 may include a sound generating mechanism 80 contained within intermediate member 12. In particular, at least one of the first and second end members 14, 16 may be operable with the intermediate member 12 to form the sound generating mechanism 80. More particularly, at least one of the first and second end members 14, 16 may be moveable, even more particularly rotatable, relative to the intermediate member 12 to provide audible sounds such as successive clicking sounds (audible to human hearing) from the sound generating mechanism 80.

Sound generating mechanism 80 may particularly be made operable by rotating at least one or both end members 14, 16 (in either a clockwise or counterclockwise direction around longitudinal axis 24) relative to intermediate member 12, or rotating intermediate member 12 (in either a clockwise or counterclockwise direction around longitudinal axis 24) relative to end member 14 and/or end member 16. Sound generating mechanism 80 may also be made operable by rotating at least one or both end members 14, 16 in a direction opposing a rotation of intermediate member 12. In other words, rotating intermediate member simultaneously with rotation of one or both end members 14, 16, albeit in the opposite direction (e.g. counterclockwise versus clockwise).

Sound generative mechanism 80 may comprise a series of teeth 82 formed (molded) with intermediate member 12 which are located on an internal portion of intermediate member 12 which defines internal passage 50. The teeth 82 may be arranged in a circular pattern around the perimeter/circumference of internal passage 50 and longitudinal axis 24 and be directed inwardly (towards) relative to longitudinal axis 24. As shown, the portion of the internal passage 50 defined by the teeth 82 has a shape of a star, and more particularly an eight pointed star.

As shown, each of teeth 82 may comprise opposing sloped faces/surfaces 84, 88 separated on each side of an apex 86. As shown in FIGS. 14 and 15, sloped faces/surfaces 84, 88 have the same slope thus making teeth 82 symmetrical on each side of apex 86. However, as shown in FIG. 3, in different embodiments, then sloped faces/surfaces 84, 88 have a different slope thus making teeth 82 asymmetrical on each side of apex 86. Depending on the direction of rotation of end members 14, 16 and intermediate member 12, either face/surface 84 or face/surface 88 may be considered an incline or decline plane.

Sound generating mechanism 80 may further comprise a teeth engagement element 90 formed (molded) with at least one of end members 14, 16. As shown, teeth engagement element 90 is formed at a proximal end of end members 14, 16 and connected thereto by a localized tab 98. Teeth engagement element 90 may be configured to engage teeth 82, by physical contact therewith, and generate successive clicking sounds when at least one of the teeth 82 and the teeth engagement element 90 is moved, and more particularly rotated, relative to the other.

Figure 7:
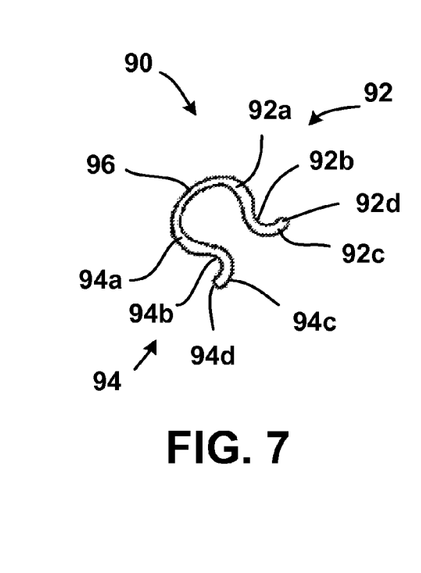
FIG. 7 is a proximal end view of a teeth engagement element of the first end member of FIG. 4
Figure 8:
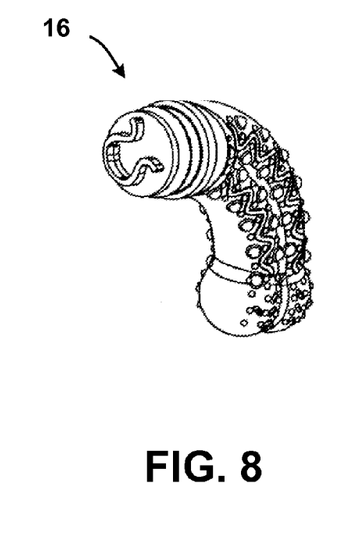
FIG. 8 is a perspective view of a second end member of the chew toy of FIG. 1.
Figure 9:
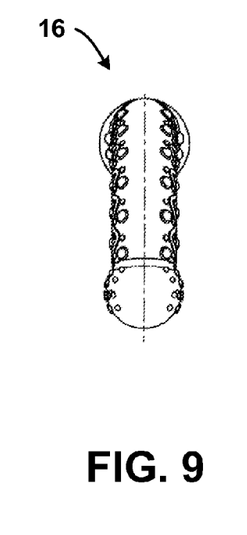
FIG. 9 is an end view of the second end member of FIG. 8.
Figure 10:
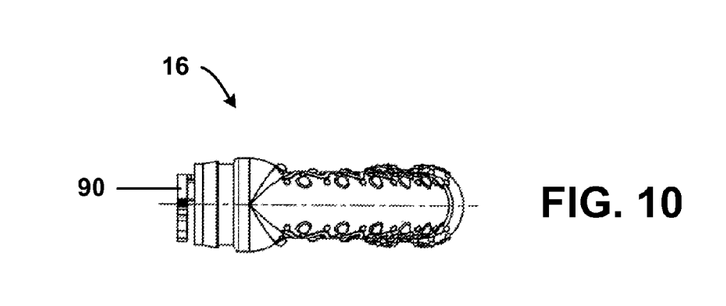
FIG. 10 is a top view of the second end member of FIG. 8.
Figure 11:
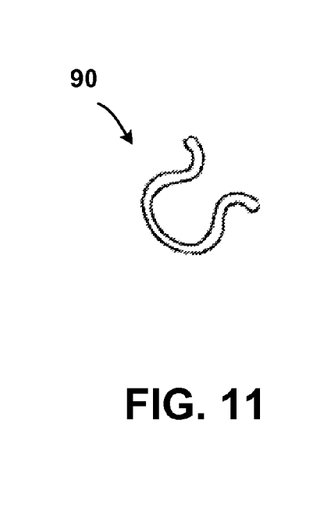
FIG. 11 is a proximal end view of a teeth engagement element of the second end member of FIG. 8.

Teeth engagement member 90 may be made of a resilient material and comprises S-shaped legs 92 and 94, which may be of similar or the same shape, and may more particularly be minor images of each other. S-shaped legs 92, 94 may be connected to one another by an intermediate adjoining arcuate segment 96, which is connected to the remainder of end members 14, 16 by tab 98. As shown in FIG. 7, S-shaped leg 92 includes opposing C-shaped segments 92a and 92b, as well as a terminal end segment 92c and terminal end 92d. Similarly, S-shaped leg 94 includes opposing C-shaped segments 94a and 94b, as well as a terminal end segment 94c and terminal end 94d.

Teeth engagement member 90, and particularly elongated S-shaped legs 92 and 94, may be configured to contact and elastically deform over teeth 82 when at least one of the teeth 82 and the teeth engagement element 90 is rotated relative to the other. More particularly, the teeth engagement element 90, and particularly S-shaped legs 92 and 94, may be configured to contact and elastically deform over the apex 86 of the teeth 82 when at least one of the teeth 82 and the teeth engagement element 90 is rotated relative to the other. Even more particularly, the teeth engagement element 90, and particularly elongated S-shaped legs 92 and 94, may be configured to undergo increasing elastic deformation as it progresses up either of incline faces/surfaces 84, 88 and approaches the apex 86 of the teeth 82 when at least one of the teeth 82 and the teeth engagement element 90 is rotated relative to the other.

Teeth engagement member 90, and particularly elongated S-shaped legs 92 and 94, may be configured to elastically recover after passing over the apex 86 of the teeth 82 when at least one of the teeth 82 and the teeth engagement element 90 is rotated relative to the other. More particularly, the teeth engagement member 90, and particularly S-shaped legs 92 and 94, may be configured to generate a clicking sound upon the elastic recovery. Without being bound to a particular theory, the clicking sound may be made by the teeth engagement member 90 rapidly striking the intermediate member 12 during elastic recovery, or the teeth engagement member 90 rapidly vibrating during elastic recovery to generate the clicking sound.

As shown in FIG. 14, teeth engagement member 90 is not in contact with teeth 86. As shown in FIG. 15, intermediate member 12 may be rotated counterclockwise around axis 24 such that the terminal end segment 92c of S-shaped leg 92 and the terminal end 94d of S-shaped leg 94 may be brought into contact (engage) with two different teeth 82 of intermediate member 12.

As intermediate member 12 may be further rotated, either or both of first and second opposing arcuate C-shaped segments 92a, 92b of S-shaped leg 92 may elastically deform (bend), and particularly contract by having the radius thereof decrease as terminal end segment 92c progresses up incline face/surface 84 towards apex 86 of tooth 82. As shown, C-shaped segment 92a has a greater radius than C-shaped segment 92b, which may result in different bending characteristics relative to one another.

Similarly, either or both of first and second opposing arcuate C-shaped segments 94a, 94b of S-shaped leg 94 may elastically deform, and particularly contract by having the radius thereof decrease as terminal end 92d progresses up incline face/surface 84 towards apex 86 of another tooth 82. Thereafter, once terminal end segment 92c of S-shaped leg 92 and terminal end 94d of S-shaped leg 94 pass the apex 86 of the respective teeth 82 to which they are engaged, the S-shaped legs 92 and 94 may then elastically recover and, in doing so, create a clicking sound.

In the foregoing manner, it should be understood that each leg 92, 94 may be configured to engage teeth 82 at different location (e.g. terminal end segment 92c and terminal end 94d) when each leg 92, 94 contacting the intermediate member 12 is rotated in one (e.g. clockwise) direction and similarly engage teeth 82 at different locations (e.g. terminal end segment 94c and terminal end 92d) when each leg 92, 94 contacting the intermediate member 12 is rotated in an opposing (e.g. counter clockwise) direction. This may in turn produce different clicking sounds from each leg 92, 94.

Figure 16:
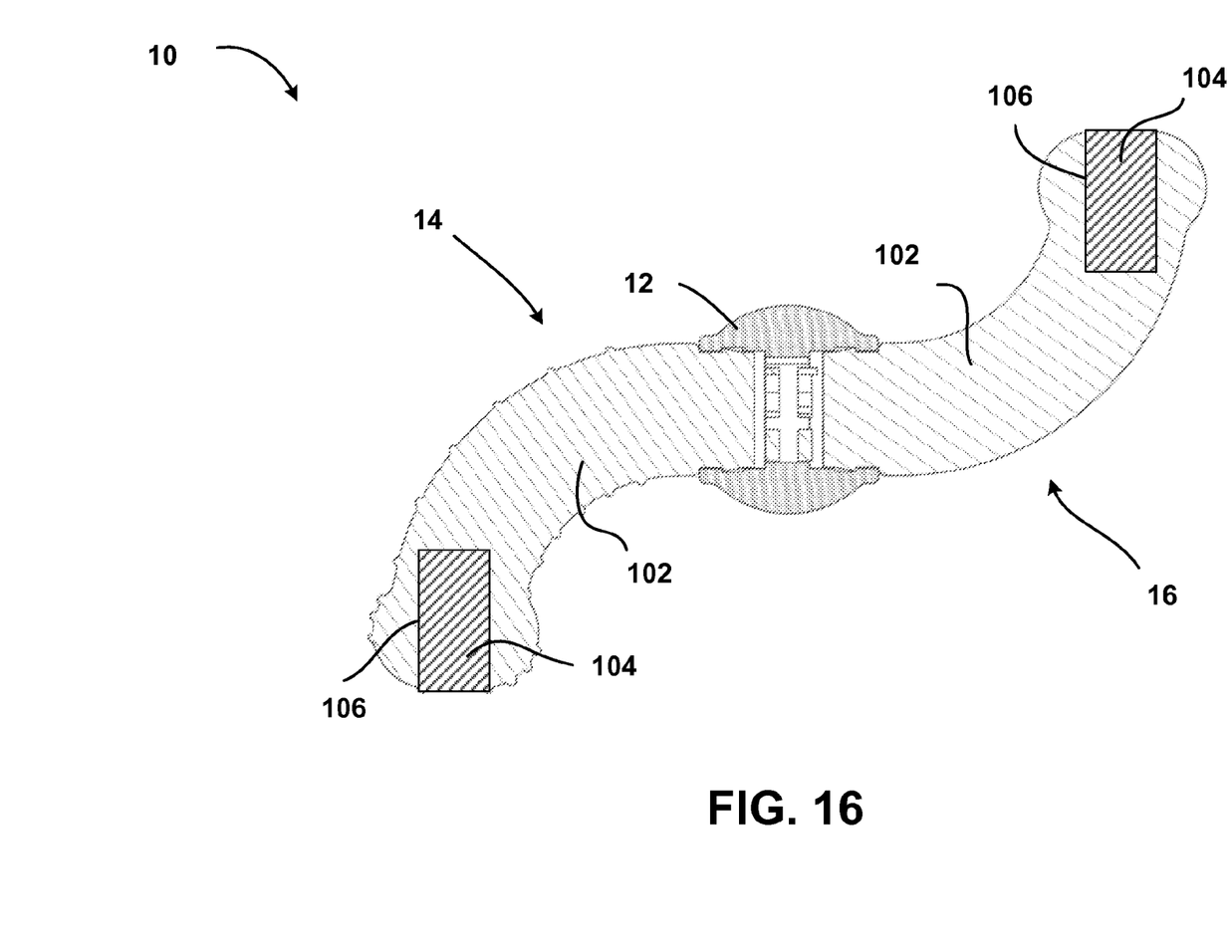
FIG. 16 is a longitudinal cross-sectional view of another embodiment of the chew toy of FIG. 1 when assembled.

Referring now to FIG. 16, there is shown another embodiment of animal chew toy 10. As shown, each end member 14, 16 may comprise a first body portion 102 made of a first material composition and a second body portion 104 made of a second material composition different than the first material composition. The first and/or second compositions may comprise edible resin compositions, which may comprise one or more edible polymers and which may be present in a range of and all increments between 30-99% by total weight of the composition.

Edible resin compositions may include any starch or carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be in a range of and all increments between 1% to 99% by total weight of the edible resin composition.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, which may be in the range of about 1-2000 μm, including all ranges and increments therein. Raw starch may be understood as milled and/or pre-sifted starch. It should be understood that the raw starch may also have varying degrees of moisture present. In one embodiment moisture may be present in the raw starch between 1-60%, including all increments and values therebetween such as 40%, 20%, 10%, etc.

The edible resin compositions herein may be sourced from Manildra Group USA, under the following tradenames: "GEMSTAR 100" which is a refined food grade wheat starch; "GEMSTAR100+" which is a refined food grade wheat starch; "GEM OF THE WEST VITAL WHEAT GLUTEN" which is a powder product by low temperature drying of gluten extracted from wheat flour; "ORGANIC GEM OF THE WEST VITAL WHEAT GLUTEN" which is a powder product by low temperature drying of gluten extracted from organic wheat flour; "ORGANIC GEMSTAR 100" which is a wheat starch extracted from organic what flour; and/or "ORGANIC GEMGEL 100" which is a pregelatinized organic wheat starch In addition, the resin composition may be sourced from ADM under the tradename "EDIGEL 100" which is a wheat resin composition; "AYTEX P" which is a unmodified food grade wheat starch.

Other edible resin compositions may be contemplated that may be derived from animal sources such as casein, denatured or hydrolyzed casein, collagen, denatured or hydrolyzed collagen, rawhide, gelatin, other animal protein products, such as animal meal. Such may also be derived from plant matter such as gluten, vegetable matter, nuts, such as nut flour, paste or bits, fruit matter, etc. It should also be appreciated that the various edible resin compositions, (i.e. starch, animal derived sources, and plant derived sources) may be blended with other edible resin compositions, thermoplastic materials, and/or thermoset materials.

For example, glutens may be incorporated into the edible resin composition. Gluten may be understood as water-insoluble protein complex extracted from cereal grains such as maize or corn and wheat. The gluten may be present individually or cumulatively between about 0.1-50% by weight of the resin composition and all increments and values therebetween including 0.1-5.0%, 15%, 25%, etc.

In addition various additives may be incorporated into the edible resin compositions. For example, the edible resin compositions may include cellulose. The cellulose may be, for example, a long-chain polymer of polysaccharide carbohydrate. The cellulose may also be derived or extracted from plants. The cellulose may be incorporated into the resin composition between about 1-15% by weight of the resin composition and any increment or value therebetween including 4%, 10%, 11%, etc.

Emulsifiers or surfactants may also be incorporated into the edible resin compositions. The emulsifier may be present between about 1-10% by weight of the resin composition and all increments or values therebetween including 3%, 4%, etc. The emulsifier may include, for example, lecithin, which may be extracted or derived from, for example, egg yolk or soy beans.

The edible resin compositions may also include a plasticizer. The plasticizer may include for example, glycerin. The plasticizer may be incorporated between about 15-30%, including all increments and values therebetween such as levels greater than 15%, 21%, 27% etc.

A humectant may also be incorporated into the edible resin composition. The humectant may include, for example, oat fiber. The humectant may be incorporated between about 0.1-5% by weight of the resin composition including all intervals and values therebetween, including 1%, 25%, etc. A humectant may be understood to be any additive that may absorb water in the material.

The edible resin compositions may also include water. The water may be introduced into the composition between about 1-40% by weight of the edible resin compositions and any increment or value therebetween, including 4%, 20-40%, 10-20%, etc. After the product has been formed, the water may be present between 1-20% by weight of the resin composition including all increments or values therebetween, such as, below 20%, 4%, 5-10%, etc.

The edible resin compositions may generally include a nutraceutical. The nutraceutical may be fermented soya. Fermented soya nutraceuticals are available from Bio Food, Ltd., Pine Brook, N.J. and sold under the general trademark Soynatto®. The fermented soya is present between about 1-40% by weight of the resin composition, including all increments and values therebetween, including 10%, 20%, etc.

The edible resin compositions may also include enzymes and/or co-enzymes which are similarly available through Bio Foods, Ltd., Pine Brook, N.J. and sold under the trademark of BT-CoQ10®. This reportedly is a biologically transformed (fermented) cell mitochondrial coenzyme and contains Coenzyme Q10, antioxidants, phytonutrients and cofactor mineral nutrients and other cell constituents. The enzymes and/or co-enzymes may be present between 0.1-10% by weight of the resin composition, including all increments and values therebetween such as 1%, 5%, etc.

In addition, herbal extracts, vitamins, minerals, colorants, yeast products, soy products, attractants, etc., may also be incorporated into the edible resin compositions. Yeast products, for example, may include nutritional yeast or brewers yeast such as saccharomyces cerevisiae, dairy yeast such as *kluyveromyce marxianus* or wine yeast such as *saccharomyces fermentati*.

Second body portion 104 may be located in a receptacle 106 of first body portion 102, such as a cylindrical receptacle 106 as shown. The material composition of the second body portion 104 may be in the form of discrete edible nuggets which may be loosely press fit in the receptacle 106, or in the form of a paste (e.g. peanut butter), for extraction by an animal.

While a preferred embodiment of the present invention has been described, it should be understood that various changes, adaptations and modifications can be made therein without departing from the spirit of the invention and the scope of the appended claims. The scope of the invention should, therefore, be determined not with reference to the above description, but instead should be determined with reference to the appended claims along with their full scope of equivalents. Furthermore, it should be understood that the appended claims do not necessarily comprise the broadest scope of the invention which the Applicant is entitled to claim, or the only manner(s) in which the invention may be claimed, or that all recited features are necessary.

What is claimed is:

1. An animal chew toy comprising:
a hollow intermediate member located between first and second opposing end members connected to the intermediate member, the first and second opposing end members being distinct from the hollow intermediate member;
the first end member connected to the intermediate member by a first rotatable joint formed between the first end member and the intermediate member;
the second end member connected to the intermediate member by a second rotatable joint formed between the second end member and the intermediate member;
a sound generating mechanism cooperatively formed by the intermediate member and at least one of the first and second end members, the sound generating mechanism comprising a teeth engagement element formed on at least one of the first and second end members that is configured to engage at least one of a plurality of teeth on the intermediate member and to contact and elastically deform over at least one of the teeth when at least one of the teeth and the teeth engagement element is rotated relative to the other about a longitudinal axis of said intermediate member; and
wherein said first rotatable joint is an interference fit joint formed by mechanically engaging said first end member with said intermediate member, such that said first end member is infinitely rotatable about said longitudinal axis of said intermediate member without disconnecting said first end member from said intermediate member.

2. The toy of claim 1 wherein:
both the first joint and the second joint are a mechanical joint.

3. The toy of claim 1 wherein:
said interference joint is a snap fit joint.

4. The toy of claim 1 wherein:
the interference joint is an annular snap fit joint.

5. The toy of claim 1 wherein:
at least one of the first end member and second end member is rotatable in a complete revolution around said longitudinal axis of the intermediate member.

6. The toy of claim 1 wherein:
at least one of the first end member and second end member is rotatable in both clockwise and counterclockwise directions around said longitudinal axis of the intermediate member.

7. The toy of claim 1 wherein:
at least one of the first and second end members rotatable relative to the intermediate member to provide successive clicking sounds from the sound generating mechanism.

8. The toy of claim 1 wherein:
at least one of the first and second end members rotatable in a clockwise direction and a counterclockwise direction around a longitudinal axis of the intermediate member to provide successive clicking sounds from the sound generating mechanism.

9. The toy of claim 1 wherein:
each of the teeth has an apex; and
the teeth engagement element is configured to contact and elastically deform over the apex of the teeth when at least one of the teeth and the teeth engagement element is rotated relative to the other.

10. The toy of claim 9 wherein:
the teeth engagement element is configured to undergo increasing elastic deformation as it approaches the apex of the teeth when at least one of the teeth and the teeth engagement element is rotated relative to the other.

11. The toy of claim 10 wherein:
the teeth engagement element is configured to elastically recover after passing the apex of the teeth when at least one of the teeth and the teeth engagement element is rotated relative to the other.

12. The toy of claim 11 wherein:
the teeth engagement member is configured to generate a clicking sound upon the elastic recovery.

13. The toy of claim 1 wherein:
the intermediate member has an internal passage; and
the plurality of teeth are arranged in a circular pattern around the internal passage.

14. The toy of claim 13 wherein:
said longitudinal axis extends through said internal passage; and
the teeth project inwardly from an inner portion of said intermediate member towards the longitudinal axis, said inner portion defining said internal passage.

15. The toy of claim 13 wherein:
the teeth are symmetrical.

16. The toy of claim 1 wherein:
the teeth engagement element is formed at a proximal end of at least one of the end members.

17. The toy of claim 1 wherein:
the teeth engagement element comprises an elongated leg.

18. The toy of claim 17 wherein:
the leg has an S-shape.

19. The toy of claim 1 wherein:
the teeth engagement element comprises first and second elongated legs configured to engage said teeth on the intermediate member.

20. The toy of claim 19 wherein:
each leg has an S-shape.

21. The toy of claim 19 wherein:
the first and second legs are mirror images of each other.

22. The toy of claim 17 wherein:
the leg is configured to engage teeth at a first location when the end member is rotated in a clockwise direction and configured to engage teeth at a second location when the end member is rotated in a counter clockwise direction.

23. The toy of claim 1 wherein:
at least one of the first and second opposing end members comprises an edible material composition.

24. The toy of claim 1 wherein:
at least one of the first and second opposing end members comprises a receptacle which contains an edible material composition.

* * * * *